(12) United States Patent
Khinvasara et al.

(10) Patent No.: US 10,574,723 B2
(45) Date of Patent: Feb. 25, 2020

(54) WEB SERVICES COMMUNICATION MANAGEMENT

(71) Applicant: Nutanix, Inc., San Jose, CA (US)

(72) Inventors: Abhijit S. Khinvasara, Los Altos, CA (US); Vinod Gupta, Fremont, CA (US); Ranjan Parthasarathy, Milpitas, CA (US)

(73) Assignee: Nutanix, Inc., San Jose, CA (US)

( * ) Notice: Subject to any disclaimer, the term of this patent is extended or adjusted under 35 U.S.C. 154(b) by 432 days.

(21) Appl. No.: 15/365,330

(22) Filed: Nov. 30, 2016

(65) Prior Publication Data

US 2020/0036769 A1 Jan. 30, 2020

(51) Int. Cl.
*G06F 15/16* (2006.01)
*H04L 29/08* (2006.01)
*H04L 29/06* (2006.01)

(52) U.S. Cl.
CPC ............. *H04L 67/02* (2013.01); *H04L 67/10* (2013.01); *H04L 67/32* (2013.01); *H04L 67/42* (2013.01)

(58) Field of Classification Search
CPC ......... H04L 67/02; H04L 67/10; H04L 67/32; H04L 67/42
USPC ........................................................ 709/219
See application file for complete search history.

(56) References Cited

U.S. PATENT DOCUMENTS

| | | | |
|---|---|---|---|
| 6,111,871 A * | 8/2000 | Chen | H04L 12/5601 370/349 |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,406,082 B2 * | 8/2016 | Smedberg | G06F 17/2235 |
| 9,772,866 B1 | 9/2017 | Aron et al. | |
| 2003/0079041 A1 * | 4/2003 | Parrella, Sr. | H03M 7/30 709/247 |
| 2003/0182364 A1 * | 9/2003 | Large | G06F 9/4843 709/203 |

(Continued)

OTHER PUBLICATIONS

Eby, Phillip J "Python Web Server Gateway Interface v1.0", Sep. 27, 2010, 28 pages.

(Continued)

*Primary Examiner* — Imad Hussain
(74) *Attorney, Agent, or Firm* — Vista IP Law Group, LLP

(57) ABSTRACT

High-performance web service communication techniques. Embodiments manage communications between a client and web services that are accessible over a network. Communications between the client and web services comprise web service calls. A client forms a batch message comprising a plurality of target web service calls directed to target web services that are identifiable by the target web service calls. A middleware component or batch processor intercepts the batch message and generates a set of individual web service calls that are derived from the contents of the batch message. Each of the set of individual service calls that are derived from the batch message are dispatched to the target web services in accordance with a set of web service call prioritization and formatting rules. Batch formation and decomposition into individual service messages is performed such that neither the target web services nor their respective invoking call formats require modification.

20 Claims, 11 Drawing Sheets

(56) References Cited

U.S. PATENT DOCUMENTS

| | | | | |
|---|---|---|---|---|
| 2005/0080930 | A1* | 4/2005 | Joseph | G06F 9/5038 709/248 |
| 2007/0074215 | A1* | 3/2007 | Bethea | H04L 67/02 718/101 |
| 2007/0082650 | A1* | 4/2007 | Zhu | H04M 7/006 455/404.1 |
| 2007/0121870 | A1* | 5/2007 | Herold | G06Q 10/06 379/201.05 |
| 2007/0208698 | A1* | 9/2007 | Brindley | G06Q 10/06 |
| 2008/0209392 | A1* | 8/2008 | Able | G06F 8/34 717/105 |
| 2009/0228545 | A1* | 9/2009 | Mendez | H04L 67/1095 709/202 |
| 2009/0281818 | A1* | 11/2009 | Li | G06Q 10/04 705/301 |
| 2009/0313628 | A1* | 12/2009 | Zhu | G06F 9/4843 718/101 |
| 2012/0057546 | A1* | 3/2012 | Wang | H04L 1/1835 370/329 |
| 2013/0121345 | A1* | 5/2013 | Zhang | H04W 28/06 370/465 |
| 2014/0074912 | A1* | 3/2014 | Nishimoto | H04L 29/06047 709/203 |
| 2014/0101235 | A1* | 4/2014 | Smedberg | G06F 17/2235 709/203 |
| 2015/0128156 | A1* | 5/2015 | Zhu | G06F 8/74 719/328 |
| 2015/0161284 | A1* | 6/2015 | Mineki | H04N 21/4126 709/213 |
| 2015/0215426 | A1* | 7/2015 | Torii | H04L 67/32 709/201 |
| 2015/0379014 | A1* | 12/2015 | Xu | G06F 17/211 707/711 |
| 2016/0309207 | A1* | 10/2016 | Brav | H04N 5/23206 |
| 2016/0344582 | A1* | 11/2016 | Shivanna | H04L 41/04 |
| 2016/0358281 | A1* | 12/2016 | Bowyer, II | G06Q 50/22 |
| 2017/0004020 | A1* | 1/2017 | Chen | G06F 9/541 |
| 2017/0346915 | A1* | 11/2017 | Gay | H04L 67/2852 |

OTHER PUBLICATIONS

Wikipedia, "Web Server Gateway Interface", Nov. 13, 2016, 6 pages.
Poitras, Steven. "The Nutanix Bible" (Oct. 15, 2013), from http://stevenpoitras.com/the-nutanix-bible/(Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication late based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.

* cited by examiner

WEB SERVICES COMMUNICATION MANAGEMENT

BACKGROUND

Modern distributed computing systems comprise components that are combined to achieve efficient scaling of distributed computing resources, such as distributed data storage resources, distributed networking resources, and/or other resources. Such distributed computing systems have evolved in such a way that incremental linear scaling can be accomplished in many dimensions. The resources in a given distributed system are often grouped into resource subsystems, such as clusters, datacenters, or sites. The resource subsystems can be defined by physical and/or logical boundaries. For example, a cluster might comprise a logically bounded set of nodes associated with a certain department of an enterprise, while a datacenter might be associated with a particular physical geographical location. Modern clusters in a distributed computing system might support over one hundred nodes (or more) that in turn support as many as several thousands (or more) autonomous virtualized entities (VEs) running various workloads. Such VEs might be virtual machines (VMs) and/or executable containers, in hypervisor-assisted virtualization environments and/or in operating system virtualization environments, respectively. The resources and/or consumers of the resources in a distributed computing system are often managed by various software services (e.g., web services, application services, etc.) implemented in the system. The software services can perform tasks such as resource monitoring, resource analysis (e.g., performance, state, health, etc.), resource scheduling (e.g., VE and/or workload creation, modification, migration, deletion, etc.), and/or other tasks. The software services are often implemented as web services having respective service application programming interfaces (APIs) to facilitate communication with one another and/or with a centralized client (e.g., application, web application) to carry out the resource management tasks. For example, a user (e.g., system administrator) might interact with a centralized cluster management application (e.g., client) to monitor and/or schedule resources at the aforementioned cluster having one hundred or more nodes and several thousand or more VEs. In this case, the centralized application might continually communicate with multiple web services across the cluster to carry out the monitoring and/or scheduling.

Unfortunately, such communications between web services often become "chatty", and/or often include redundant and/or unnecessary re-presentations of message information (e.g., headers, bodies, payloads, etc.). At the same time, application developers and web service developers do not want to rearchitect the web service or their APIs. Nevertheless, even though the application developers and web service developers do not want to rearchitect code, in many distributed computing systems, the number of messages between certain clients and their accessed web services becomes more and more voluminous. Such "chatty" web services can introduce bandwidth consumption (e.g., from message overhead) and/or response latencies (e.g., from sequential message processing) and/or other issues that might result in a degradation of the system performance and/or degradation of the use experience. Some legacy approaches seek to address such issues by merely implementing changes to the web service API to consolidate certain messages. With such legacy approaches, each web service and/or application has to be modified to send, receive, and process such consolidated messages—which modifications demand a significant level of human and financial resources. Worse, with legacy approaches, there is no guarantee that a revised API will be adopted, thus introducing the possibility of inconsistencies and/or conflicts among various versions of the modified web service APIs. What is needed is a technological solution for addressing the performance impact (e.g., bandwidth consumption, response latencies, etc.) of "chatty" web service interactions—yet without modifying the underlying web services.

SUMMARY

The present disclosure provides a detailed description of techniques used in systems, methods, and in computer program products for web services communication management, which techniques advance the relevant technologies to address technological issues with legacy approaches. More specifically, the present disclosure provides a detailed description of techniques used in systems, methods, and in computer program products for managing communications between web service clients and providers in distributed computing environments. Certain embodiments are directed to technological solutions for implementing a batch message processor to receive a batched set of service request messages that are dispatched to a corresponding set of target web services.

The disclosed embodiments modify and improve over legacy approaches. In particular, the herein-disclosed techniques provide technical solutions that address the technical problems attendant to chatty communications when accessing web services in distributed computing systems. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of designing and deploying high performance web service infrastructure as well as advances in various technical fields related to computing cluster management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
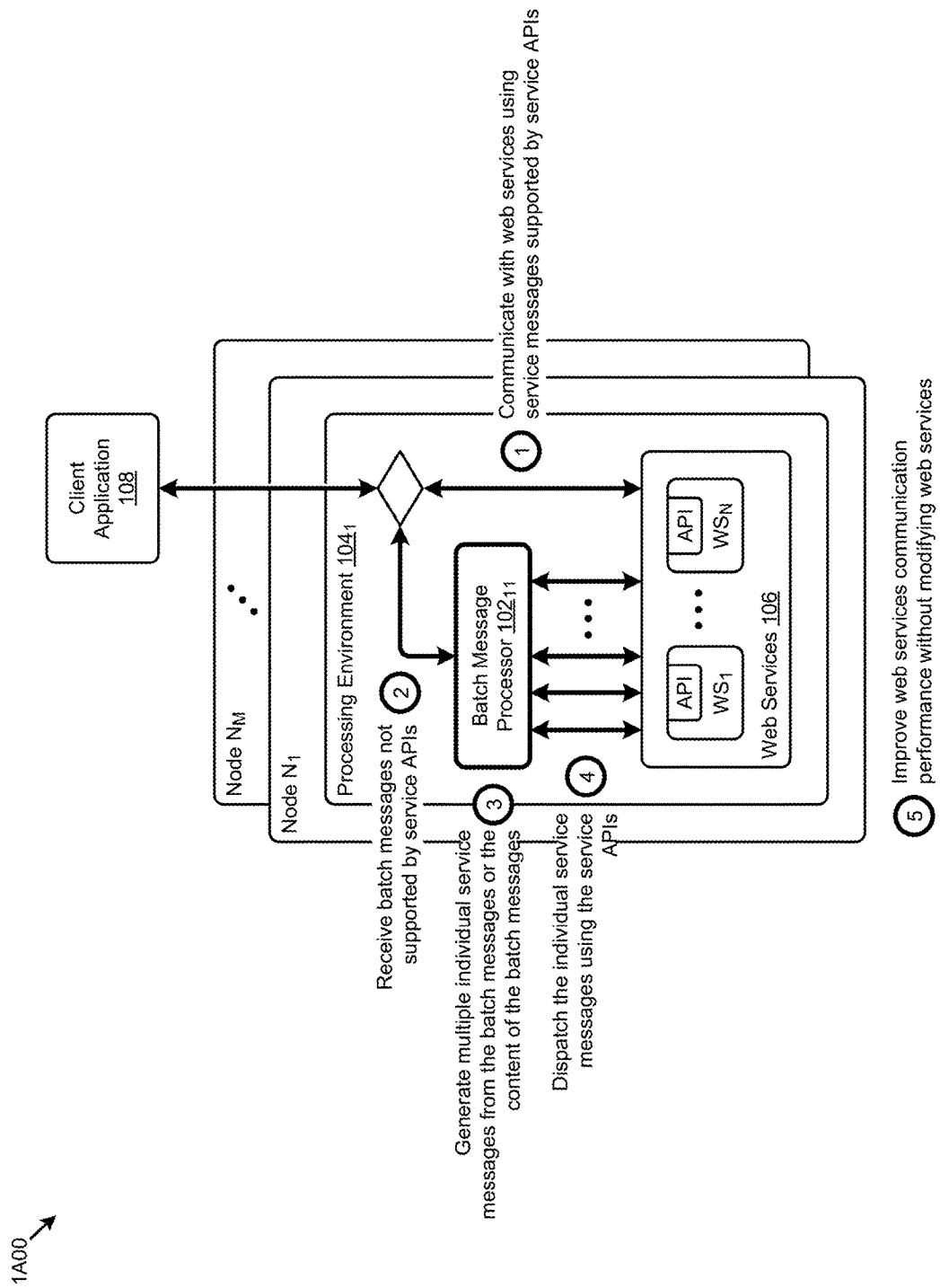
FIG. 1A presents a web services communication management technique for handling batched communications between web service clients and providers in distributed computing environments, according to an embodiment.

Embodiments in accordance with the present disclosure address the problem of chatty communications when accessing web services in distributed computing systems. Some embodiments are directed to approaches for implementing a batch message processor to receive a batched set of service messages that are dispatched to a corresponding set of target web services in a distributed computing system. The accompanying figures and discussions herein present example environments, systems, methods, and computer program products for managing communications between web service clients and providers in such distributed computing environments.

Overview

Disclosed herein are techniques for implementing a batch message processor to receive a batched set of service messages that are dispatched to a corresponding set of target web services. In many environments, various web services have respective service APIs that facilitate communication of service messages (e.g., calls, requests, responses, etc.) between themselves and client applications, and/or between certain web services among themselves (e.g., when one web service relies on another web service). Batch messages comprising information that describes a set of such service messages are received at the batch message processor. The batch message processor generates the set of service messages from a given batch message, and dispatches the service messages individually to the corresponding target web services according to their respective unmodified service APIs. In some embodiments, the batch message processor consolidates certain responses from the target web services into a batch message that is returned in a response to an invoking web service and/or client application. In some embodiments, the batch message processor is implemented as a layer between a web server interface and a web application framework in a web services stack. In some embodiments, the batch message processor exposes a callable object to a client application to receive the batch messages. In some embodiments, the service messages are dispatched by the batch message processor in a manner (e.g., with multithreading, with multiprocessing, etc.) specified by a set of dictionary objects. In yet other embodiments, certain aspects (e.g., service message order, etc.) and/or constituents (e.g., header, body, etc.) of the batch messages can be managed so as to achieve one or more quantitative objectives.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A presents a web services communication management technique 1A00 for handling batched communications between web service clients and providers in distributed computing environments. As an option, one or more variations of web services communication management technique 1A00 or any aspect thereof may be implemented in the context of the architecture and functionality of the embodiments described herein. The web services communication management technique 1A00 or any aspect thereof may be implemented in any environment.

The embodiment shown in FIG. 1A is merely one example implementation of a technological solution for batching multiple instances of service messages used to communicate with set of web services so as to improve the performance (e.g., response time, reliability, etc.) of such communications without modification to the web services. As shown, a client application 108 communicates with a set of web services 106 (e.g., $WS_1, \ldots, WS_N$) in a processing environment $104_1$. As depicted in the embodiment of FIG. 1A, the processing environment $104_1$ might be associated with one node (e.g., node $N_1$) of several nodes (e.g., node $N_M$) in a distributed computing environment. A set of respective service APIs at each of the web services 106 facilitates the communication between the client application 108 and the web services 106 (operation 1).

According to the herein disclosed techniques, a batch message issued by the client application 108 is received at an instance of a batch message processor $102_{11}$ implemented in the processing environment $104_1$ (operation 2). A given batch message comprises information in a message body that describes multiple instances of service messages, but also message communication information (e.g., header, status, etc.) pertaining to a single message (e.g., the batch message). Further, the batch messages are constructed so as to be received by the batch message processor $102_{11}$ (but not by the web services 106). Responsive to receiving the batch messages, the batch message processor $102_{11}$ generates a set of service messages derived from the information in each of the batch messages (operation 3). The generated service messages are then dispatched to the web services 106 in accordance with their respective service APIs (operation 4). The web service communication performance improvements facilitated by the overhead efficiencies of the batch messages are achieved with no modification to the web services 106 and/or the service APIs (operation 5).

Figure 1B:
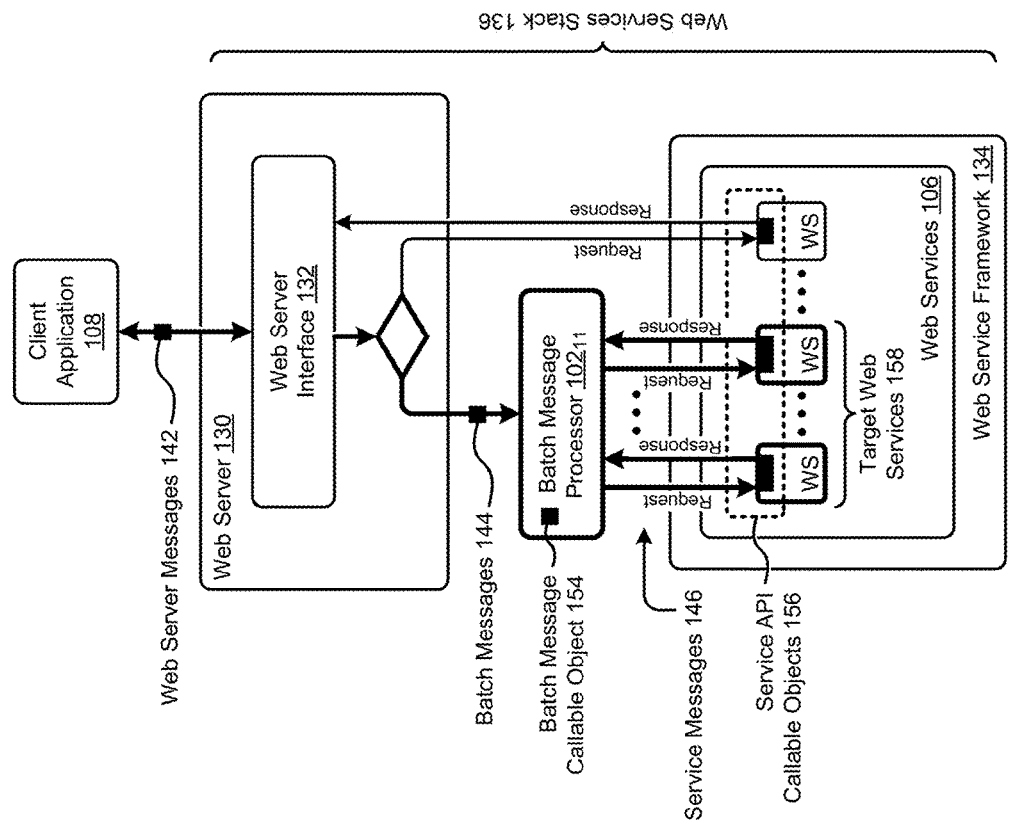
FIG. 1B depicts a service message batching technique as implemented in systems for managing communications between web service clients and providers in distributed computing environments, according to an embodiment.
Figure 1B:
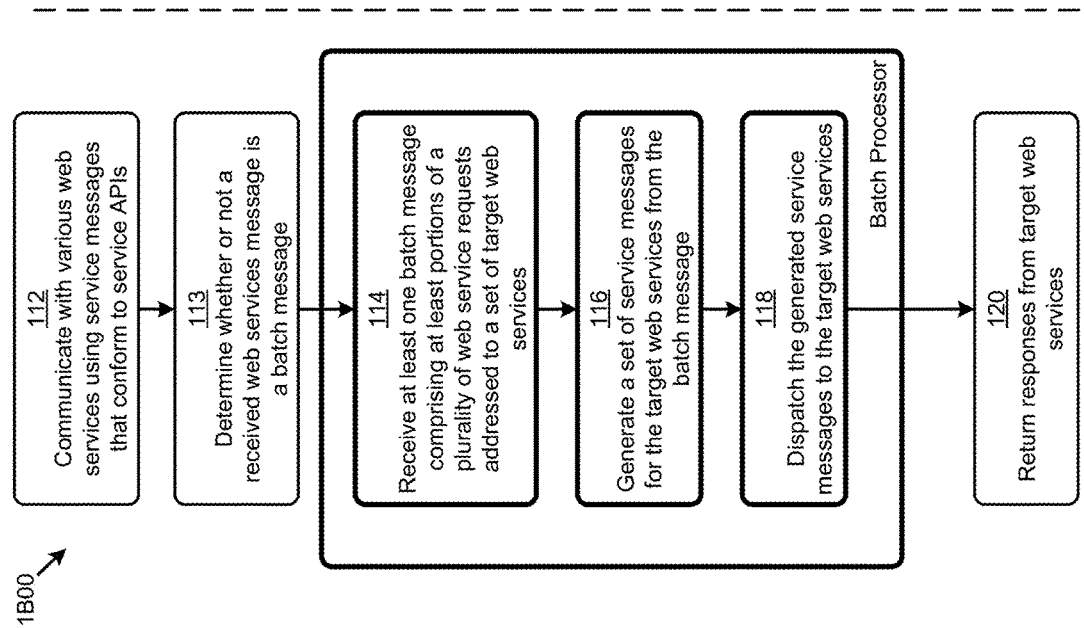

Further details describing an embodiment of a service message batching technique facilitated by a batch message processing layer in a web services stack is shown and described as pertaining to FIG. 1B.

FIG. 1B depicts a service message batching technique 1B00 as implemented in systems for managing communications between web service clients and providers in distributed computing environments. As an option, one or more variations of service message batching technique 1B00 or any aspect thereof may be implemented in the context of the architecture and functionality of the embodiments described herein. The service message batching technique 1B00 or any aspect thereof may be implemented in any environment.

The embodiment shown in FIG. 1B is merely one example implementation of the herein disclosed techniques to batch multiple service messages into one batch message to facilitate efficient communications with web services in distributed computing systems. Such web services are systems of software that allow different machines to interact with each other through a network. Web services use various APIs, languages (e.g., XML, JSON, etc.), frameworks (e.g., Flask, Django, etc.), protocols (e.g., HTTP, SOAP, etc.), and/or other facilities to achieve this task. Web services are often implemented to achieve reusability of certain application components such as weather reports, currency converters, and/or other components. In some cases, web services are implemented in certain environments (e.g., hyperconverged distributed computing environments) to carry out tasks specific to the particular environment. For example, web services in a hyperconverged distributed computing system might be used to create a virtual machine, delete a virtual machine, create a storage volume (e.g., virtual disk), and/or perform other operations. A service message comprises various data and/or instructions organized into a data structure for delivery to or receipt from the web services. Since web services are often accessed over a network (e.g., the Internet, an intranet, etc.), service messages are likewise often structured to conform to a network communication protocol and/or to a web server. For example, a given service message (e.g., request, response, etc.) might be communicated in HTTP for processing at a web server built on the Web Server Gateway Interface (WSGI) standard.

As can be observed, the embodiment in FIG. 1B shows a batch message processor $102_{11}$ implemented as a layer in a web services stack 136 to carry out certain steps and/or operations comprising the service message batching technique 1B00. Specifically, batch message processor $102_{11}$ is implemented in the web services stack 136 between a web server 130 comprising a web server interface 132 (e.g., WSGI), and a web service framework 134 (e.g., Flask). As shown, a set of web services 106 are implemented in the web service framework 134 to facilitate access to the web services 106 by the web server 130 and the batch message processor $102_{11}$ according to the herein disclosed techniques. Specifically, a client application 108 can exchange instances of web server messages 142 with web server 130 to communicate with any of the web services 106 using the service APIs provided by the web services (step 112). For example, the web services 106 can expose a set of service API callable objects 156 to the web server interface 132 to facilitate direct communications with any of the web services. As earlier mentioned, such direct communications with web services can often become "chatty", and/or often include redundant and/or unnecessary re-presentations of message information (e.g., headers, bodies, payloads, etc.). At the same time, application developers and web service developers do not want to rearchitect the web service APIs.

The herein disclosed techniques, and specifically, the service message batching technique 1B00 shown in FIG. 1B, can address such web services communications issues by facilitating receipt of batch messages at the batch message processor $102_{11}$. For example, instances of batch message 144 that comprise information intended for a set of target web services 158 are sent. A determination is made as to whether or not the web services message is a batch message (step 113). If so then the web services message that was deemed to be a batch message is sent to a batch processor. Upon being received by the batch processor (step 114). In some embodiments, a batch processor such as the shown batch message processor $102_{11}$ exposes a batch message callable object 154 to web server interface 132 to receive the batch messages 144. A set of service messages for the target web services are generated from each received batch message (step 116). Such service messages (e.g., service messages 146) are generated so as to interact with the service API callable objects 156 provided by the web services 106 and web service framework 134. The generated service messages are then dispatched to the target web services 158 (step 118). The target web services process the requests associated with the service messages resulting in responses that are returned to web server interface 132 and/or batch message processor $102_{11}$ (step 120).

Figure 2:
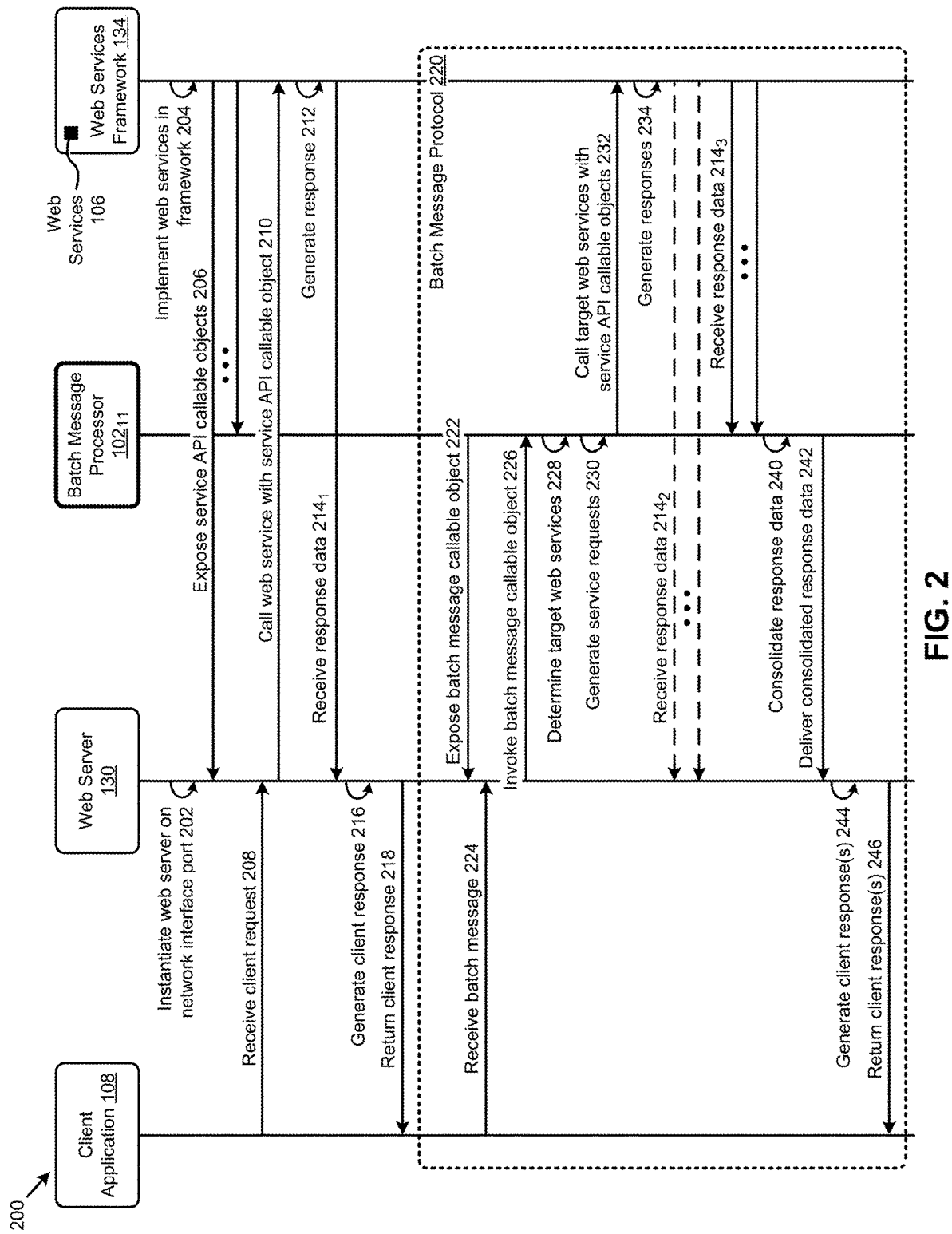
FIG. 2 presents an interaction diagram showing an inter-component protocol that facilitates carrying out batched service message communications in distributed computing systems, according to an embodiment.

Further details characterizing the interactions between some of the components shown in FIG. 1B are shown and described as pertaining to FIG. 2.

FIG. 2 presents an interaction diagram 200 showing an inter-component protocol that facilitates carrying out batched service message communications in distributed computing systems. As an option, one or more variations of interaction diagram 200 or any aspect thereof may be implemented in the context of the architecture and functionality of the embodiments described herein. The interaction diagram 200 or any aspect thereof may be implemented in any environment.

Interaction diagram 200 presents various components earlier described as pertaining to FIG. 1B exhibiting a set of high order interactions (e.g., operations, messages, etc.) to facilitate implementations of the herein disclosed techniques. Specifically shown are the client application 108, the web server 130, the batch message processor $102_{11}$, and the web service framework 134. As shown in the interaction diagram 200, the web server 130 can be instantiated on a certain network port (operation 202). For example, web server 130 might be instantiated on port "8888" on a node having an IP address of "123.0.0.1". In this case, the web server 130 will listen for messages on port "8888". A set of web services (e.g., web services 106) are also implemented in the web service framework 134 (operation 204). The web service framework 134, among other functions, provides a known interface for access to the web services 106 by the web server 130, the batch message processor $102_{11}$, and/or other clients, applications, or services. Specifically, web service framework 134 facilitates such access by exposing service API callable objects associated with the web services 106 to the web server 130 (message 206). Such service API callable objects might comprise, for example, a callable name (e.g., "create_vm", "delete_vm", etc.), a set of arguments (e.g., environ argument, "start_response" argument, etc.), and/or other object attributes. A client request (e.g., http://123.0.00.1:8888/create_vm/ . . . ) received from the client application 108 at the web server 130 (message 208) can then generate a call to a web service (e.g., "create_vm") using the service API callable object (message 210). The called web service generates a response (operation 212) and the response data is received at the web server 130 (message $214_1$). For example, the web service framework 134 and/or the called web service might generate HTTP status and/or HTTP response headers and pass them to the "start_response" callable to be accessed by the web server 130. A response body can also be returned in the response data. The web server 130 generates a client response from the response data (operation 216) and returns the generated response to the client (message 218). For example, web server 130 might combine the status, the response headers, and the response body into an HTTP response to transmit to the client application 108.

To receive and process batched service messages according to the herein disclosed techniques, a set of interactions comprising a batch message protocol 220 are executed. Specifically, batch message processor $102_{11}$ exposes a batch message callable object to the web server (message 222). For example, the batch message callable object might be structured as the aforementioned service API callable objects with a name of "batch". Batch messages received at the web server 130 from the client application 108 (message 224) will then invoke the batch message callable object (message 226). Using the information provided in the batch message, batch message processor $102_{11}$ will determine the target web services corresponding to the batch message (operation 228) and generate a set of service requests for those target web services (operation 230). The generated services messages are sent by calling the target web services using their respective service API callable objects (message 232). The called target web services each generate a response (operation 234). In some cases, the response data is received at the web server 130 (message $214_2$). In other cases, the response data from the target web services is received at the batch message processor $102_{11}$ (message $214_3$). The batch message processor can consolidate the response data from the target web services (operation 240) and deliver the consolidated response data to the web server 130 (message 242). The web server 130 generates a client response from the consolidated response data or client responses from the respective response data from the target web services (operation 244) and returns the generated response or responses to the client (message 246).

Figure 3:
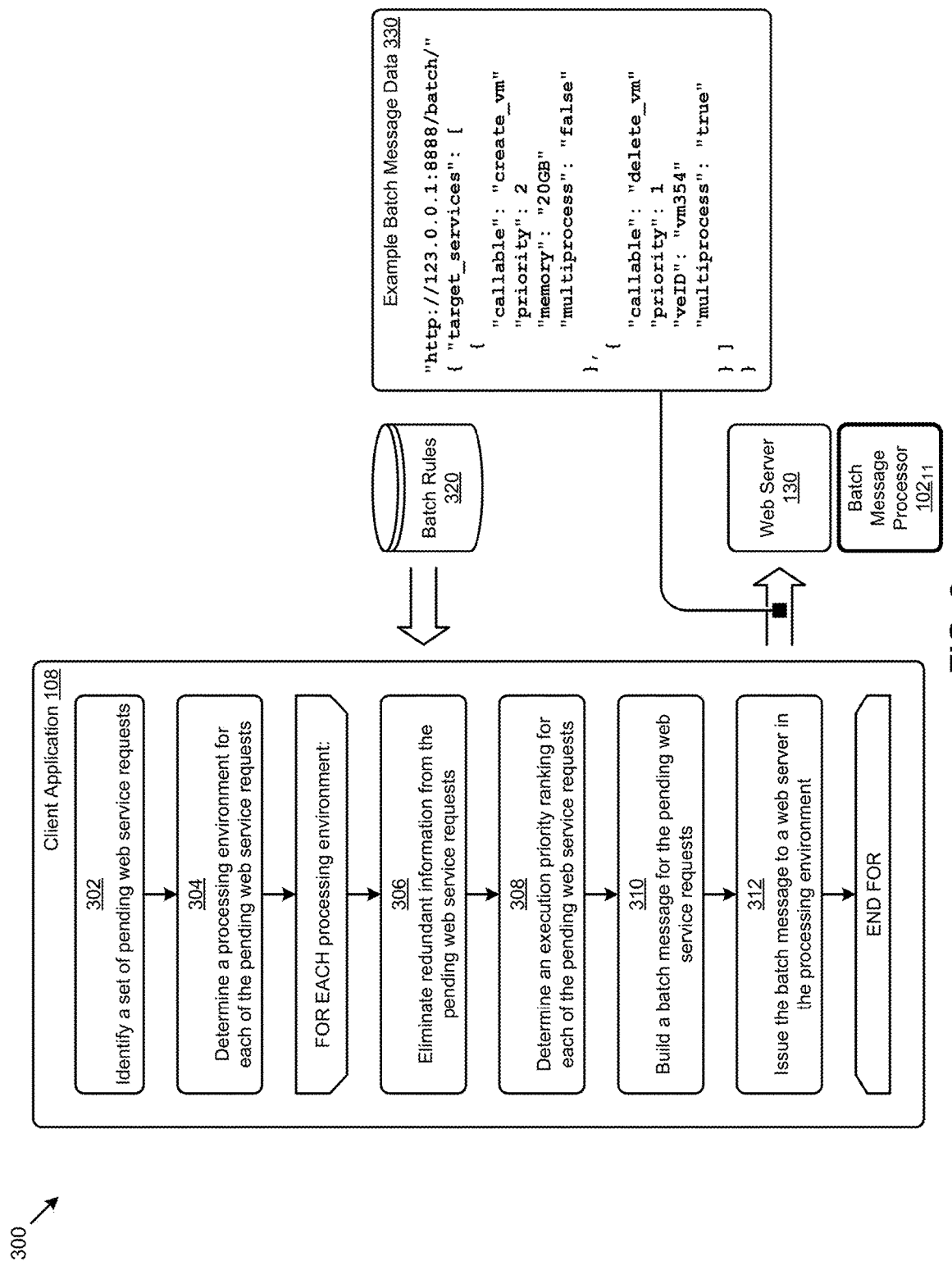
FIG. 3 depicts a batched service message generation technique as implemented in systems that implement batched service message communications in distributed computing systems, according to an embodiment.

Additional details related to building the batch messages received at the batch message processor according to the herein disclosed techniques are shown and described as pertaining to FIG. 3.

FIG. 3 depicts a batched service message generation technique 300 as implemented in systems that implement batched service message communications in distributed computing systems. As an option, one or more variations of batched service message generation technique 300 or any aspect thereof may be implemented in the context of the architecture and functionality of the embodiments described herein. The batched service message generation technique 300 or any aspect thereof may be implemented in any environment.

Shown in FIG. 3 is one embodiment of various steps and/or operations performed by a client application 108 to generate batch messages as implemented according to the herein disclosed techniques. Certain specialized data structures that are designed to improve the way a computer stores and retrieves data in memory when performing such steps and/or operations are also shown. As can be observed, the client application 108 can identify a set of pending web service requests (step 302). For example, a set of service requests might be placed in a queue for processing in response to a resource scheduling change invoked (e.g., by a user, etc.) at a cluster of a distributed computing system. A processing environment for processing each of the pending web service requests is determined (step 304). A processing environment is a logically and/or physically bounded set of resources in the distributed computing environment capable of carrying out any of the operations described herein. For example, a processing environment might correspond to one or more nodes in the distributed computing system. As another example, a processing environment might be defined by one or more virtual machines and/or containers in the system. In some cases, the service request parameters will dictate the processing environment. For example, certain changes to a node might be performed only by that same node. In other cases, the processing environment might be determined dynamically based on load balancing techniques.

When the processing environments are determined for the pending web service requests, then for each processing environment, any redundant information in the subset of the pending web service requests for that particular environment are eliminated (step 306). For example, certain status, header, environment variables, and/or other information shared by the service requests can each be consolidated to one instance.

An execution priority ranking for each of the pending web service requests can also be determined (step 308). In some cases, a set of batch rules 320 can be applied to the pending requests to determine such rankings. For example, a rule that indicates all "delete_vm" calls are to be executed before any "create_vm" calls for a given node can be applied to, in part, determine an execution priority ranking. Other batch rules are possible.

Depending on the specific characteristics and specific applications of the rules, the execution priority ranking for each of the pending web service requests can result in sequential dispatching, or parallel dispatching, or any combination of sequential or parallel dispatching. In some scenarios, priority ranking is not used, and dispatching of web service requests may occur in any order, without regard to the timing of the receipt of any response from the web service. In various scenarios, the service requests can be dispatched synchronously, while the responses are collected asynchronously. In various scenarios, the service requests can be dispatched asynchronously without regard to the timing or ordering of the dispatch.

In still other scenarios, the responses to the dispatched web services might be partial responses, and/or such responses to the dispatched web services may be provided as a sequence or a stream. Dispatch of batched web service calls can be performed synchronously or asynchronously. In some cases, sets of asynchronous calls can be dispatched separately from sets of synchronously calls. The determination to group certain web service calls into a particular group for dispatch can be based on variables such as, (1) expected web service response times (e.g., based on observed patterns), and/or (2) expected round-trip time (e.g., considering network traffic, etc.).

At step 310, the client application 108 builds a batch message for the pending web service requests based on the foregoing rules, and/or prioritization and/or scheduling, and/or other information. The batch message is then issued to a web server (e.g., web server 130) and associated instance of a batch message processor (e.g., batch message processor $102_{11}$ at the subject processing environment (step 312). The batch messages might comprise data such as depicted in the example batch message data 330. Specifically, example batch message data 330 indicates the target processing environment in the specified IP address (e.g., "123.0.0.1") and port (e.g., "8888"). The "batch" callable is also specified. The example batch message data 330 further depicts representative attributes pertaining to each pending web service request (e.g., "target services") for the particular processing environment. Specifically depicted are a "callable" attribute, a "priority" attribute, a "memory" attribute, a virtualized entity identifier or "veID" attribute, and a "multiprocess" attribute. As can be observed, the shown execution priority (e.g., priority=1) of the "delete_vm" call is ranked higher than the shown execution priority (e.g., priority=2) of the "create_vm" call as specified, for example, by the batch rules 320.

Figure 4:
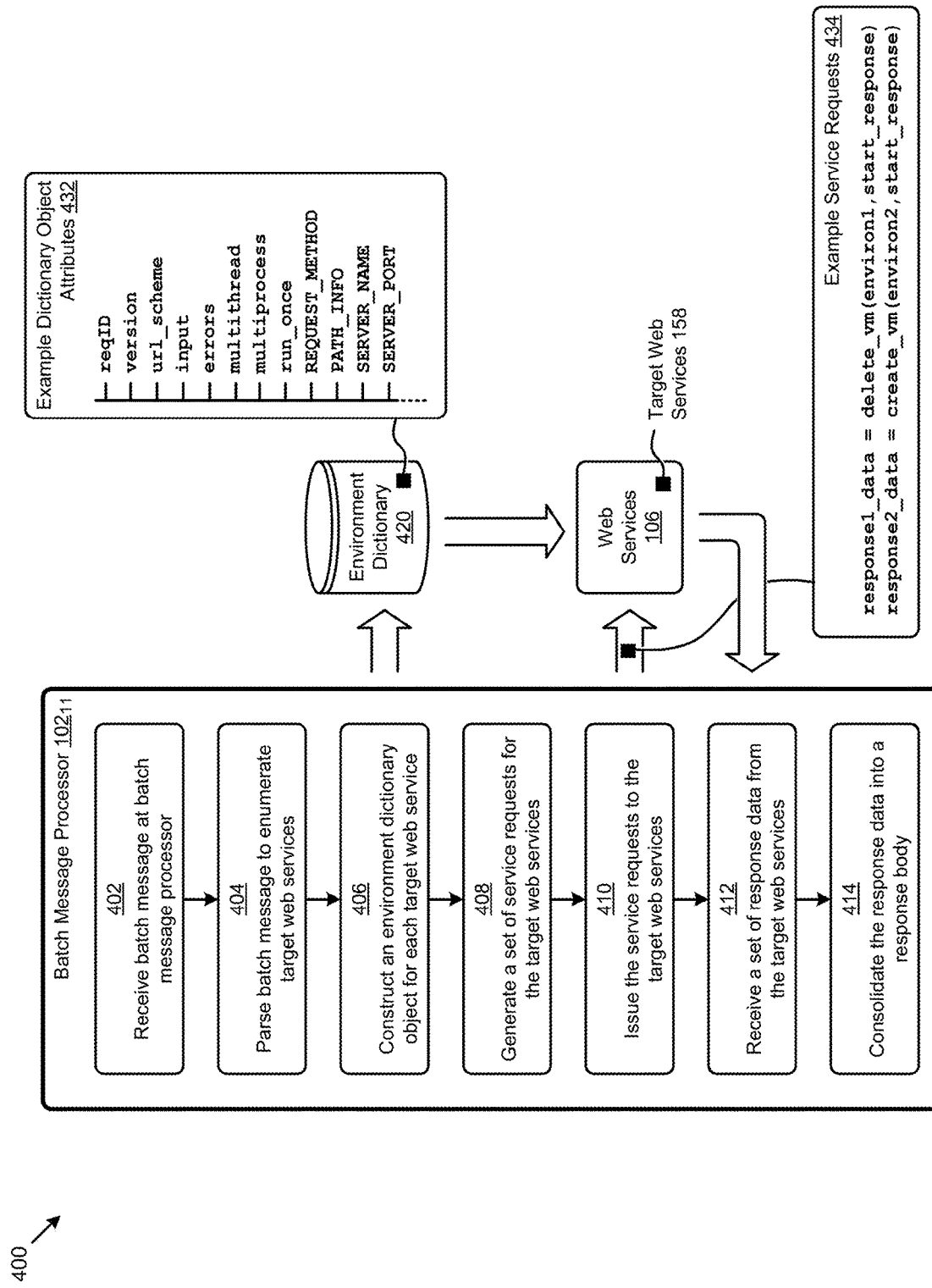
FIG. 4 depicts a batched service message processing technique as implemented in systems that implement batched service message communications in distributed computing systems, according to an embodiment.

One embodiment of a technique for processing batch messages as generated by the batched service message generation technique 300 and/or as described herein is shown and described as pertaining to FIG. 4.

FIG. 4 depicts a batched service message processing technique 400 as implemented in systems that implement batched service message communications in distributed computing systems. As an option, one or more variations of batched service message processing technique 400 or any aspect thereof may be implemented in the context of the architecture and functionality of the embodiments described herein. The batched service message processing technique 400 or any aspect thereof may be implemented in any environment.

Shown in FIG. 4 is one embodiment of various steps and/or operations performed by a batch message processor (e.g., batch message processor $102_{11}$) to receive and process batch messages according to the herein disclosed techniques. Certain specialized data structures that are designed to improve the way a computer stores and retrieves data in memory when performing such steps and/or operations are shown. As can be observed, batch message processor $102_{11}$ can receive a batch message from, for example, a web server in a particular processing environment in a distributed computing system (step 402). For example, the batch message might be structured as shown and described as pertains to FIG. 3. The batch message is parsed to enumerate the target web services to be addressed by the batch message (step 404). For each identified target web service, an environment dictionary object is constructed (step 406). The environment dictionary object is a set of data records describing certain attributes associated with a service message (e.g., request) corresponding to a particular web service. The dictionary object is passed with a service request to a target web service to facilitate processing the service request. As an example, the environment dictionary object can be passed to a service API callable object in the aforementioned "environ" argument. The dictionary objects are often organized and/or stored in a tabular structure (e.g., relational database table) having rows corresponding to a particular service request and columns corresponding to various attributes pertaining to that service request. For example, as depicted in the example dictionary object attributes 432, a table row might describe a service request identifier or "reqID", a web server interface "version" (e.g., "(1, 0)"), a URL scheme or "url_scheme" (e.g., "http"), a request argument "input" method (e.g., "stringIO (request_data)"), an "errors" reporting method (e.g., "sys.stderr"), a "multithread" switch setting (e.g., "true" or "false"), a "multiprocess" switch setting (e.g., "true" or "false"), an execution attempt switch or "run once" setting (e.g., "true" or "false"), a request method or "REQUEST METHOD" (e.g., "GET"), a navigation path or "PATH INFO" (e.g., "/create_vm"), a server IP address or "SERVER_NAME" (e.g., "123.0.0.1"), a server port or "SERVER_PORT" (e.g., "8888"), and/or other attributes. As an example, a "true" "mutithread" switch setting might indicate that a corresponding web service may be simultaneously invoked by another thread in the same process. Also, a "true" "multiprocess" switch setting might indicate that an equivalent web service may be simultaneously invoked by another process.

In addition to constructing the environment dictionary objects for the target web services, batch message processor $102_{11}$ generates a set of service requests for the target web services (step 408) to issue to the target web services (step 410). For example, as shown, batch message processor $102_{11}$ might issue the example service requests 434 to the target web services 158 from the web services 106. As can be observed, the example service requests 434 depict representative calls to the "delete_vm" and "create_vm" callable objects, in priority order, passing the respective environment dictionary objects (e.g., "environ1" and "environ2") to the web service, and returning the response to a respective response object (e.g., "response1_data" and "response2_data"). In certain embodiments, such response data can be received at the batch message processor $102_{11}$ from the target web services (step 412) and consolidated into a batched response message (e.g., comprising a single response body), which can in turn be used in communicating a response back to the client that issued the service requests (step 414).

Figure 5A:
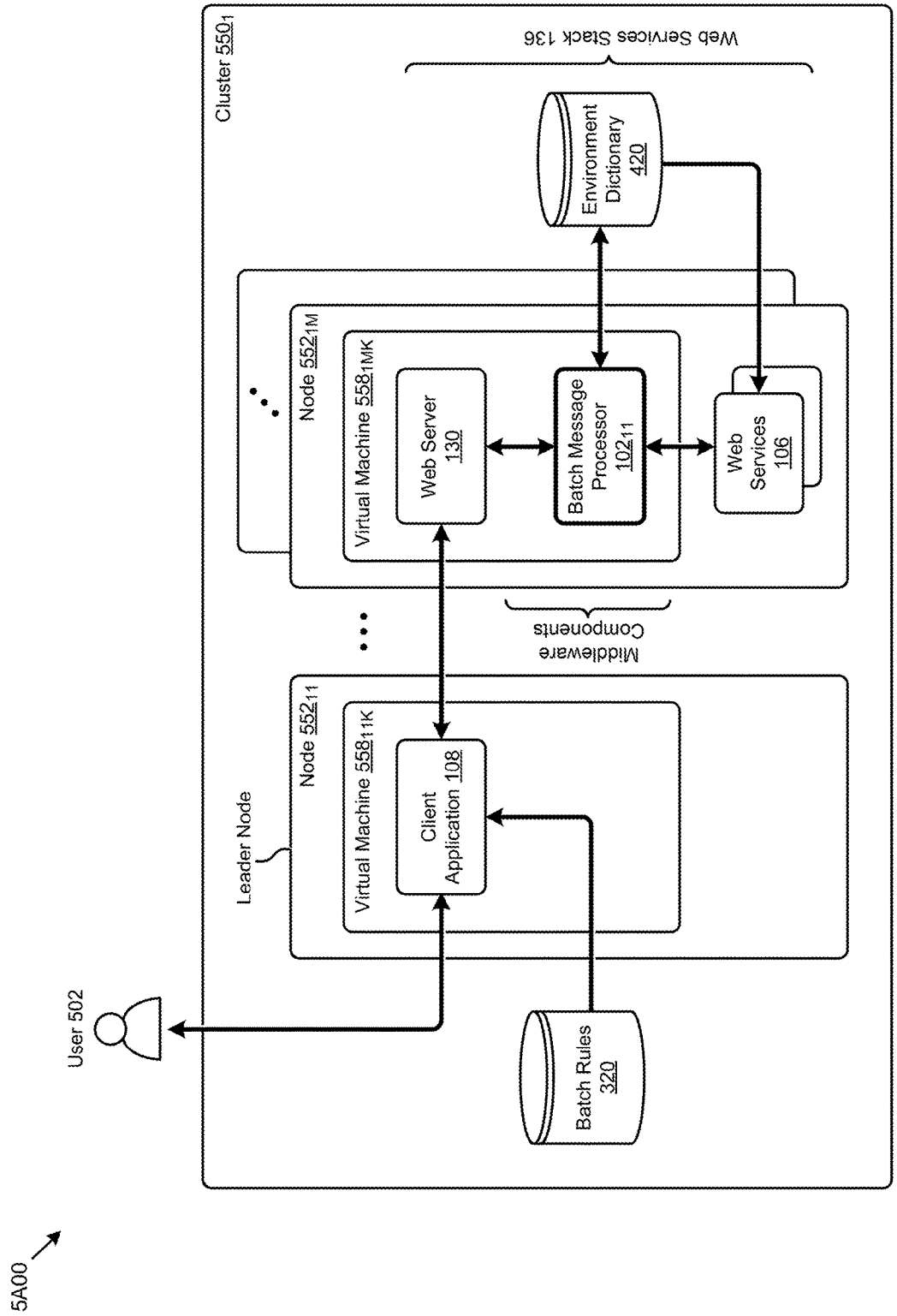
FIG. 5A and FIG. 5B depict computing environments that supports various techniques to perform cluster-wide web service operations as used in systems that implement batched service message communications, according to an embodiment.
Figure 5B:
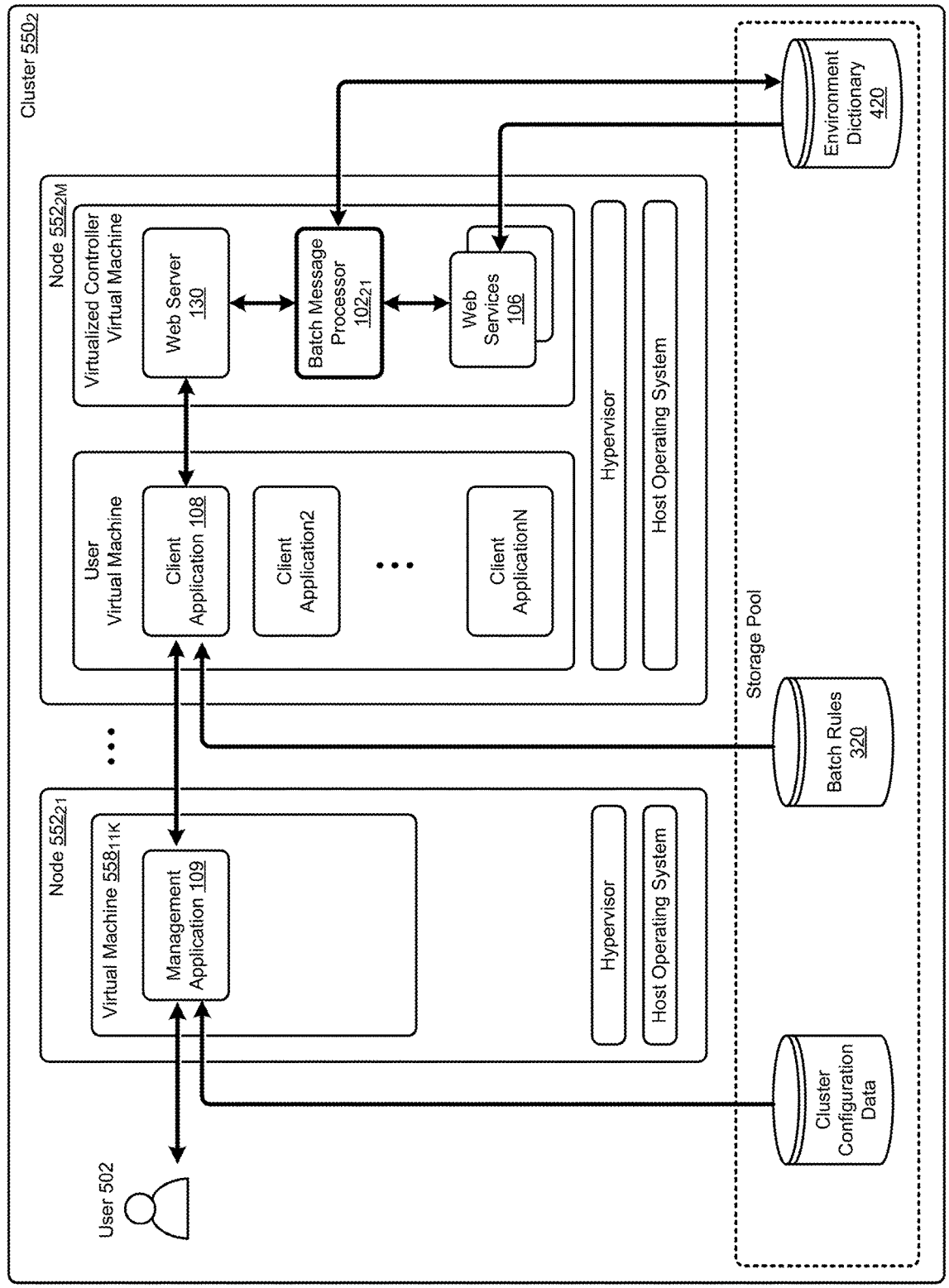

One embodiment of a subsystem and corresponding data flows for implementing any of the herein disclosed techniques is shown and described as pertaining to FIG. 5A and FIG. 5B.

FIG. 5A depicts a computing environment 5A00 that supports various techniques to perform cluster-wide web service operations as used in systems that implement batched service message communications. As an option, one or more variations of computing environment 5A00 or any aspect thereof may be implemented in the context of the architecture and functionality of the embodiments described herein.

The computing environment 5A00 shown in FIG. 5A is merely one example of components and data flows implemented in a cluster (e.g., cluster $550_1$) of a distributed computing system to support any of the herein disclosed techniques. As can be observed, cluster $550_1$ comprises multiple nodes (e.g., node $552_{11}$, node $552_{1M}$, etc.) that in turn support multiple autonomous virtualized entities, such as virtual machine $558_{11K}$ and virtual machine $558_{1MK}$. In the shown embodiment, the client application 108 is implemented at virtual machine $558_{11K}$.

Centralized Cluster Operations and Distribution to Nodes of a Cluster

Batch processor code (e.g., a portion of a middleware stack) and any batch rules 320 can be distributed throughout nodes of a cluster. The rules can be accessed by instances of client application 108, for example, by accessing a rulebase that had been stored in a shared location accessible through storage pool I/O. Or, the rulebase or portion thereof can be distributed at any time to any one or more other nodes of the cluster, possibly in a package that includes batch processor executable code. As one example of distribution from a central node to other nodes of a cluster, a particular node (e.g., the shown node $552_{11}$) might be elected as a centralized node or leader node for cluster $550_1$ and the elected node's instance of client application 108 can serve as a centralized access point for a user 502 to perform cluster-wide web service operations, including distribution and invocation of node-specific instances of the batch message processor.

Operations invoked by user 502 at client application 108 are facilitated by communication links between the client application and instances of a web server instantiated at some or all of the nodes in cluster $550_1$. A representative instance of such web servers (e.g., web server 130) is shown at virtual machine $558_1$.

As described herein, web server 130 interacts with batch message processor $102_{11}$ to handle batch messages at web server 130. Other instances of the batch message processor can be implemented at other processing environments (e.g., nodes) for access by other web servers in cluster $550_1$. As shown, batch message processor $102_{11}$ interacts with environment dictionary 420 and web services 106 to carry out the operations associated with the batch messages. The environment dictionary can be accessed by any of a variety of middleware components (e.g., components that interact with a web services design language (WSDL), a web services gateway interface (WSGI) etc.). The shown environment dictionary can implement all or a portion of the facilities of a web services design language and/or all or a portion of a web services gateway interface.

The components and data flows shown in FIG. 5A present merely one partitioning and associated data manipulation approach. The specific example shown is purely exemplary, and other subsystems and/or partitioning are reasonable, and other partitionings that implement the herein disclosed techniques are presented and discussed as pertains to FIG. 5B.

FIG. 5B depicts a partitioning where a first node (e.g., node $552_{21}$) of a cluster $550_2$ implements a management application 109 whereby a user can manage components and data within systems that implement batched service message communications. As shown, the management application 109 within node $552_{21}$ interfaces with node $552_{2M}$. The client application 108 with node $552_{2M}$ runs in a user virtual machine over a hypervisor, which is in turn situated atop a host operating system. The client application 108, and/or client application2, and/or client application can use any web services. In some cases, client application 108 forms batch message data comprising web service calls, at least some of which web service calls are intended for the web services 106. In accordance with the foregoing techniques (e.g., the batch message data formation techniques of FIG. 3), the batch can be issued to a web server. In this example partitioning, such a web server is situated in a virtualized controller virtual machine that manages all storage I/O to and from a storage pool. As shown, the virtualized controller also comprises an instance of the batch message processor $102_{21}$. At any time during operation, the batch message processor accesses (e.g., via reads and/or writes) an environment dictionary that is situated in the storage pool.

The storage pool serves to store any data of the cluster. As examples, the storage pool can store node-specific or node-local data, and/or networked storage data that is accessible by any node in the cluster. In this configuration, when a client application issues a batch of web service calls that are intended for the web services 106, the web server component of the virtualized controller intercepts the batch message and forwards it to the batch message processor $102_{21}$. The batch message processor in turn processes the batch message in accordance with the heretofore-described techniques. The results of execution of the web services are returned to the issuer of respective web service calls.

As such, the virtualized controller virtual machine implements a processing stack, whereby various processing services implemented within the processing stack are subsumed within the virtualized controller virtual machine that runs atop a hypervisor. The virtualized controller virtual machine is configured to act on behalf of other virtual machines (e.g., the user virtual machine, as shown) so as to intercept batch messages and process the constituent web services messages.

Figure 6:
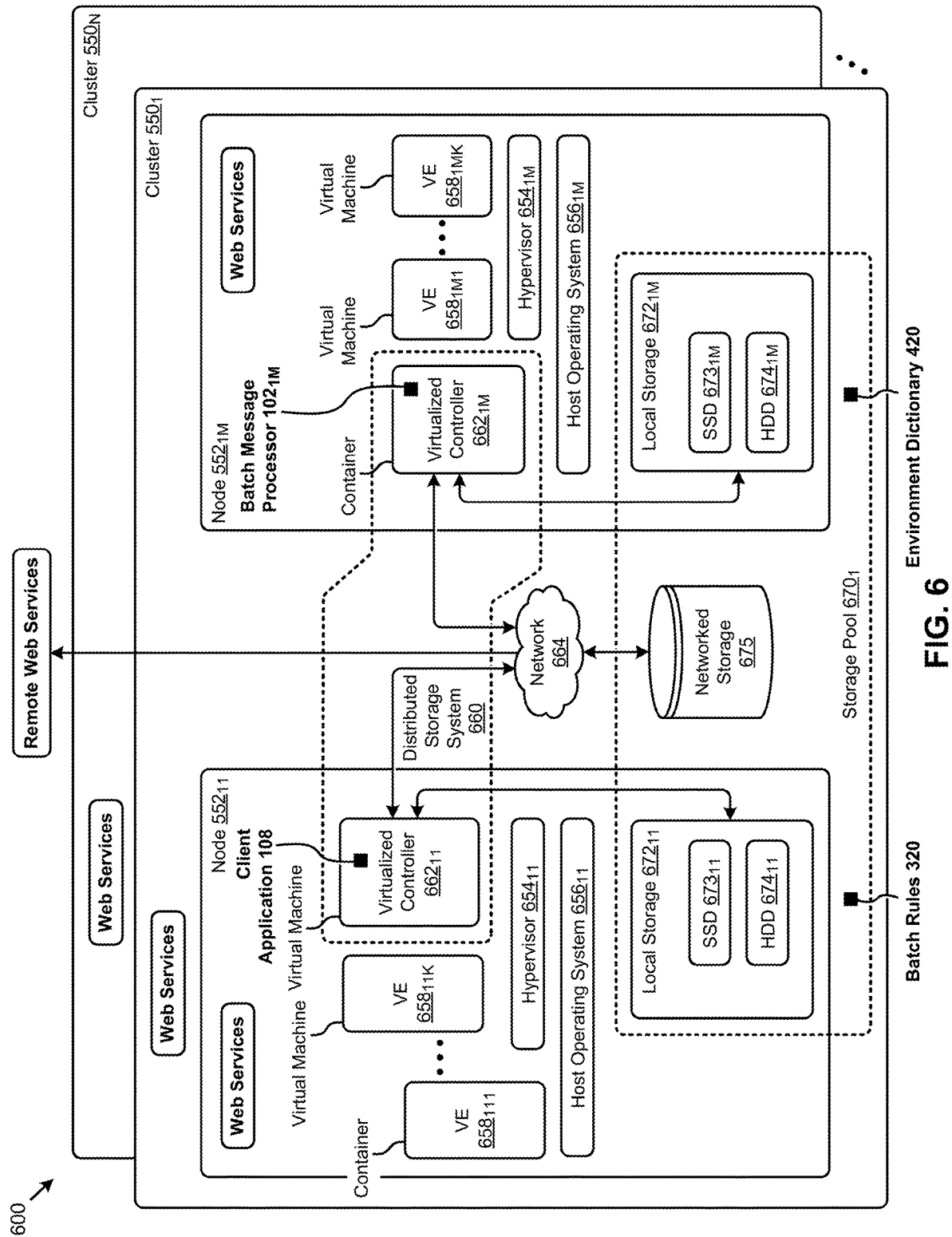
FIG. 6 presents a hyperconverged distributed computing environment that supports various techniques as used in systems that implement environment in which embodiments of the present disclosure can operate.

Still further computing environments that support components, data flows, and/or partitionings are presented and discussed as pertains to FIG. 6.

FIG. 6 presents a hyperconverged distributed computing environment 600 that supports various techniques as used in systems that implement environment in which embodiments of the present disclosure can operate. As an option, one or more variations of hyperconverged distributed computing environment 600 or any aspect thereof may be implemented in the context of the architecture and functionality of the embodiments described herein. The hyperconverged distributed computing environment 600 or any aspect thereof may be implemented in any environment.

The shown distributed computing environment depicts various components associated with one instance of a hyperconverged distributed computing system (e.g., distributed virtualization system) comprising a distributed storage system 660 that can be used to implement the herein disclosed techniques. Specifically, the hyperconverged distributed computing environment 600 comprises multiple clusters (e.g., cluster $550_1$, ..., cluster $550_N$) comprising multiple nodes that have multiple tiers of storage in a storage pool. Representative nodes (e.g., node $552_{11}$, ..., node $552_{1M}$) and storage pool $670_1$ associated with cluster $550_1$ are shown. Each node can be associated with one server, multiple servers, or portions of a server. The nodes can be associated (e.g., logically and/or physically) with the clusters. As shown, the multiple tiers of storage include storage that is accessible through a network 664, such as a networked storage 675 (e.g., a storage area network or SAN, network attached storage or NAS, etc.). The multiple tiers of storage further include instances of local storage (e.g., local storage $672_{11}$, ..., local storage $672_{1M}$). For example, the local storage can be within or directly attached to a server and/or appliance associated with the nodes. Such local storage can include solid state drives (SSD $673_{11}$, ..., SSD $673_{1M}$), hard disk drives (HDD $674_{11}$, ..., HDD $674_{1M}$), and/or other storage devices.

As shown, the nodes in hyperconverged distributed computing environment 600 can implement one or more user virtualized entities (e.g., VE $658_{111}$, ..., VE $658_{11K}$, ..., VE $658_{1M1}$, ..., VE $658_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $656_{11}$, ..., host operating system $656_{1M}$), while the VMs run multiple applications on various respective guest operating systems. Such flexibility can be facilitated at least in part by a hypervisor (e.g., hypervisor $654_{11}$, ..., hypervisor $654_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $656_{11}$, ..., host operating system $656_{1M}$) without, in most cases, a hypervisor layer. This lightweight implementation can facilitate efficient distribution of certain software components, such as applications or services (e.g., micro-services). As shown, hyperconverged distributed computing environment 600 can implement both a hypervisor-assisted virtualization environment and a container virtualization environment for various purposes.

The shown computing environment 600 also comprises at least one instance of a virtualized controller to facilitate access to storage pool $670_1$ by the VMs and/or containers. As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a hypervisor).

Multiple instances of such virtualized controllers can coordinate within a cluster to form the distributed storage system 660 which can, among other operations, manage the storage pool $670_1$. This architecture further facilitates efficient scaling of the distributed virtualization system. The foregoing virtualized controllers can be implemented in hyperconverged distributed computing environment 600 using various techniques. Specifically, an instance of a virtual machine at a given node can be used as a virtualized controller in a hypervisor-assisted virtualization environment to manage storage and I/O activities. In this case, for example, the virtualize entities at node $552_{11}$ can interface with a controller virtual machine (e.g., virtualized controller $662_{11}$) through hypervisor $654_{11}$ to access the storage pool $670_1$. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 660.

For example, a hypervisor at one node in the distributed storage system 660 might correspond to VMware ESXi software, and a hypervisor at another node in the distributed storage system 660 might correspond to Nutanix AHV software. As another virtualized controller implementation example, containers (e.g., Docker containers) can be used to implement a virtualized controller (e.g., virtualized controller $662_{1M}$) in an operating system virtualization environment at a given node. In this case, for example, the virtualized entities at node $552_{1M}$ can access the storage pool $670_1$ by interfacing with a controller container (e.g., virtualized controller $662_{1M}$) through hypervisor $654_{1M}$ and/or the kernel of host operating system $656_{1M}$.

In certain embodiments, one or more instances of a batch message processor can be implemented in the distributed storage system 660 to facilitate the herein disclosed techniques. Specifically, as shown, batch message processor $102_{1M}$ can be implemented in the virtualized controller $662_{1M}$. Such instances of the batch message processor and/or virtualized controller can be implemented in any node in any cluster. Actions taken by one or more instances of the batch message processor and/or virtualized controller can apply to a node (or between nodes), and/or to a cluster (or between clusters), and/or between any resources or subsystems or processing environments accessible by the virtualized controller or their agents (e.g., batch message processor). As further shown, any of the foregoing virtualized entities can host instances of the earlier described client application, web server, and/or other components and/or agents. For example, client application 108 might run on the virtual machine running the virtualized controller $662_{11}$. As can be observed, the datastores associated with the herein disclosed techniques can be stored in various storage facilities in the storage pool $670_1$. As an example, various instances of the batch rules 320 and environment dictionary 420 might be distributed across the storage pool $670_1$ to facilitate reliable access by various instances of the client application, the batch message processor, and/or the virtualized controller. The web services accessed according to the herein disclosed techniques can operate on any of the nodes in a given cluster and/or can operate cooperatively across multiple nodes of the cluster, or can operate in a different cluster, or can operate from a remote web services facility located at a remote location accessible over a network.

ADDITIONAL EMBODIMENTS OF THE DISCLOSURE

Additional Practical Application Examples

Figure 7:
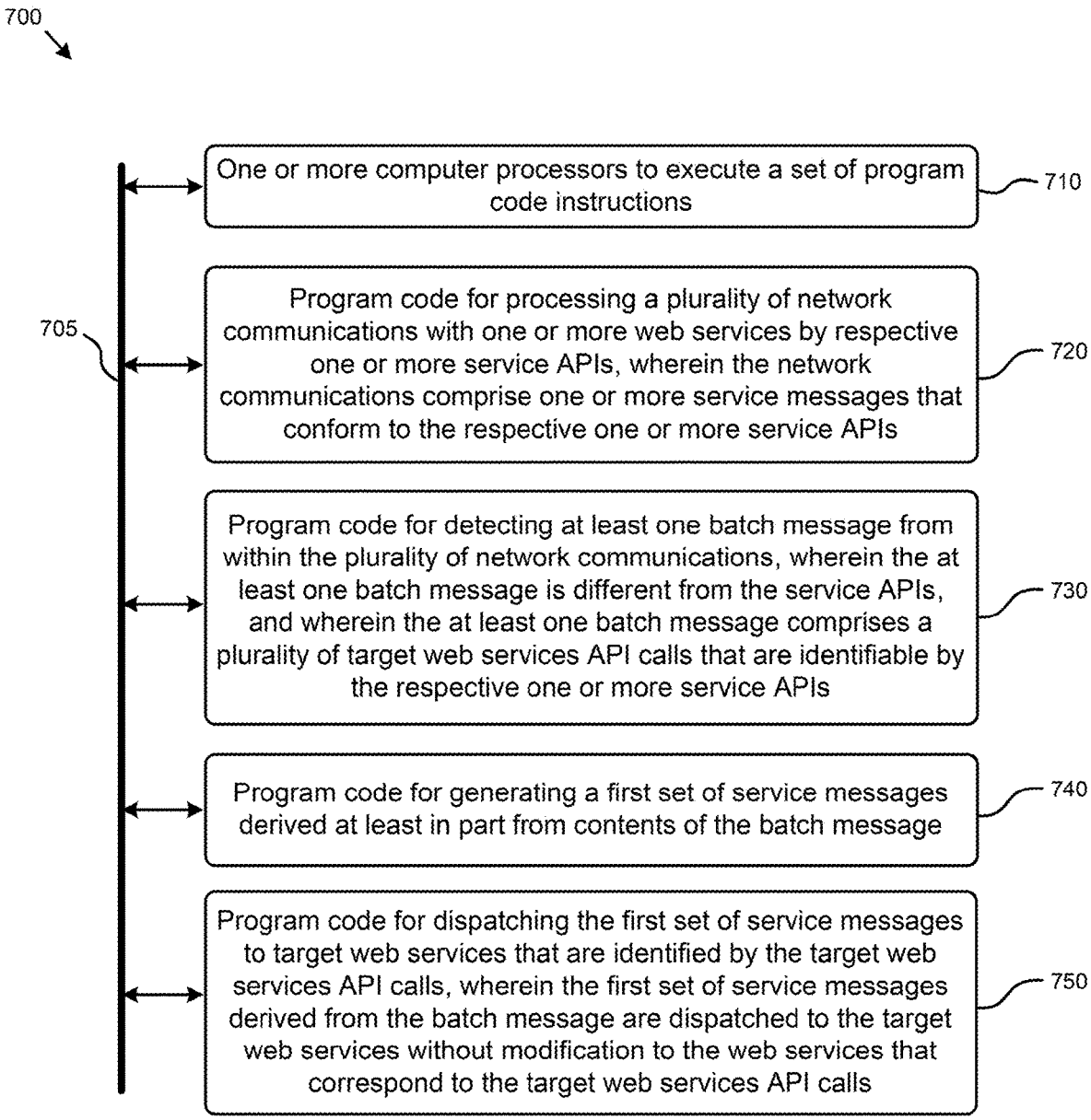
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address chatty communications when accessing web services in distributed computing systems. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising a computer processor to execute a set of program code instructions (module 710) and modules for accessing memory to hold program code instructions to perform: processing a plurality of network communications with one or more web services using respective one or more service APIs, wherein the network communications comprise one or more service messages that conform to the respective one or more service APIs (module 720); detecting at least one batch message from within the plurality of network communications, wherein the at least one batch message is nonconformant with respect to the service APIs, and wherein the at least one batch message comprises a plurality of target web services API calls that are identifiable by the respective one or more service APIs (module 730); generating a first set of service messages derived at least in part from the batch message (module 740); and dispatching the first set of service messages to target web services that are identified by the target web services API calls, wherein the first set of service messages derived from the batch message are dispatched to the target web services without modification to the web services that correspond to the target web services API calls (module 750).

Figure 8A:
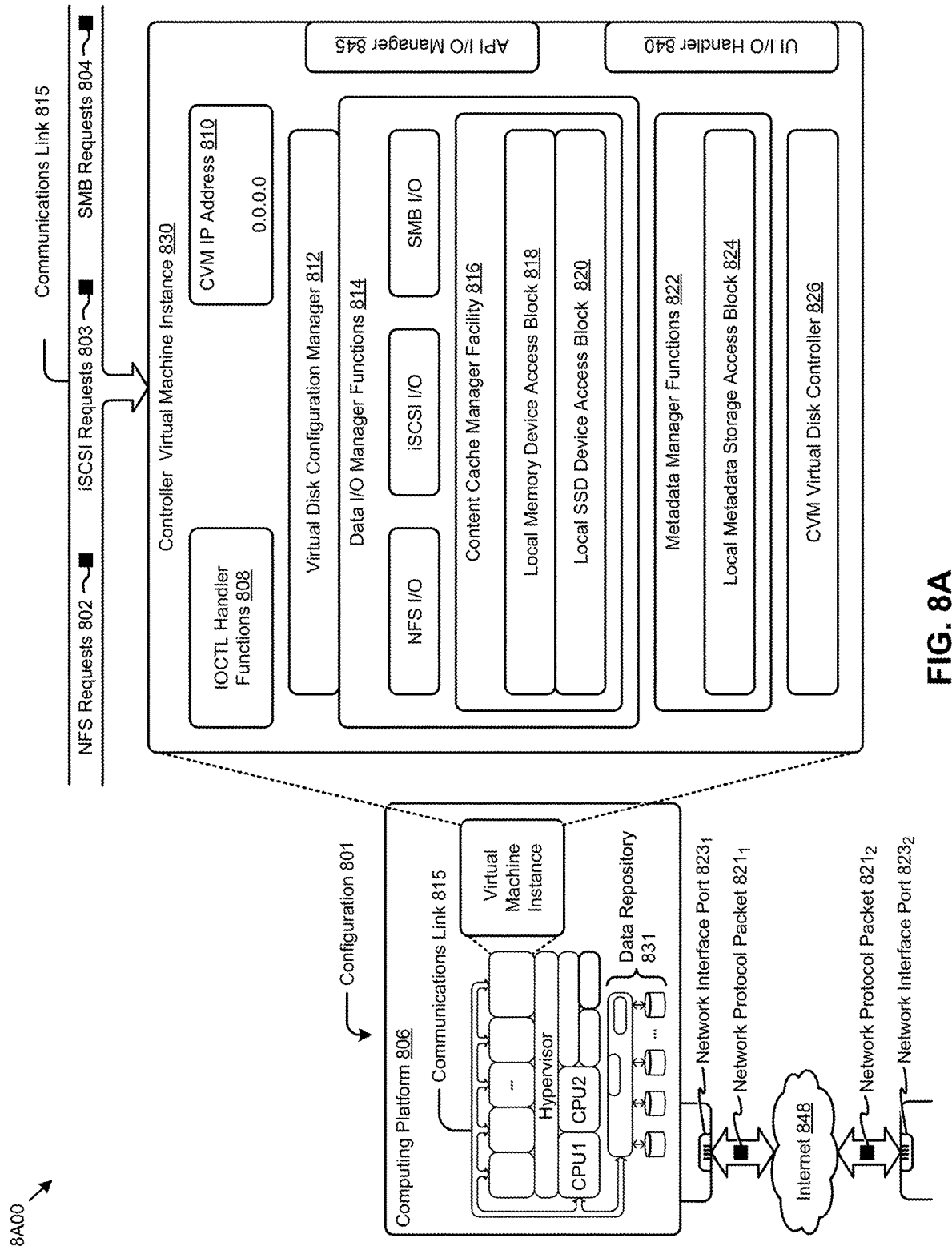
FIG. 8A and FIG. 8B depict virtualized controller architectures comprising collections of interconnected components suitable for implementing embodiments of the present disclosure and/or for use in the herein-described environments.

Variations of the foregoing may include more or fewer of the shown modules. Certain variations may perform more or fewer (or different) steps, and/or certain variations may use data elements in more, or in fewer (or different) operations.
System Architecture Overview
Additional System Architecture Examples FIG. 8A depicts a virtualized controller as implemented by the shown virtual machine architecture 8A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being designed for, or dedicated to, computing and/or networking operations. Interconnected components in a distributed system can operate cooperatively so as to serve a particular objective, such as to provide high-performance computing, high-performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates efficient use of compute and storage resources by and between the components of the distributed system. Adding a hyperconverged unit to a hyperconverged system expands the system in multiple dimensions. As an example, adding a hyperconverged unit to a hyperconverged system can expand in the dimension of storage capacity while concurrently expanding in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 8A00 comprises a collection of interconnected components suitable for implementing embodiments of the present disclosure and/or for use in the herein-described environments. Moreover, the shown virtual machine architecture 8A00 includes a virtual machine instance in a configuration 801 that is further described as pertaining to the controller virtual machine instance 830. A controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL functions 808) that interface to other functions such as data IO manager functions 814 and/or metadata manager functions 822. As shown, the data IO manager functions can include communication with a virtual disk configuration manager 812 and/or can include direct or indirect communication with any of various block IO functions (e.g., NFS IO, iSCSI IO, SMB IO, etc.).

In addition to block IO functions, the configuration 801 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

The communications link 815 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 830 includes a content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). An external data repository 831 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 824. The external data repository 831 can be configured using a CVM virtual disk controller 826, which can in turn manage any number or any configuration of virtual disks.

Execution of the sequences of instructions to practice certain embodiments of the disclosure are performed by one or more instances of a software instruction processor, or a processing element such as a data processor, or such as a central processing unit (e.g., CPU1, CPU2). According to certain embodiments of the disclosure, two or more instances of a configuration 801 can be coupled by a communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). The configuration 801 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

The computing platform 806 may transmit and receive messages that can be composed of configuration data, and/or any other forms of data and/or instructions organized into a data structure (e.g., communications packets). In some cases, the data structure includes program code instructions (e.g., application code) communicated through the Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or results of executing program code can be delivered to a particular user via a download (e.g., a download from the computing platform 806 over the Internet 848 to an access device).

The configuration 801 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provision of power to the other units. In some cases, a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to managing communications between web service clients and providers in hyperconverged distributed computing environments. In some embodiments, a module may include one or more state machines and/or combinational logic used to implement or facilitate the operational and/or performance characteristics pertaining to managing communications between web service clients and providers in hyperconverged distributed computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing communications between web service clients and providers in hyperconverged distributed computing environments). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to managing communications between web service clients and providers in hyperconverged distributed computing environments, and/or for improving the way data is manipulated when performing computerized operations pertaining to implementing a batch message processor to receive a batched set of service messages that are dispatched to a corresponding set of target web services in a hyperconverged distributed computing system.

Further details regarding general approaches to managing data repositories are described in U.S. Pat. No. 8,601,473 titled, "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled, "METHOD AND SYSTEM FOR IMPLEMENTING MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 8B:
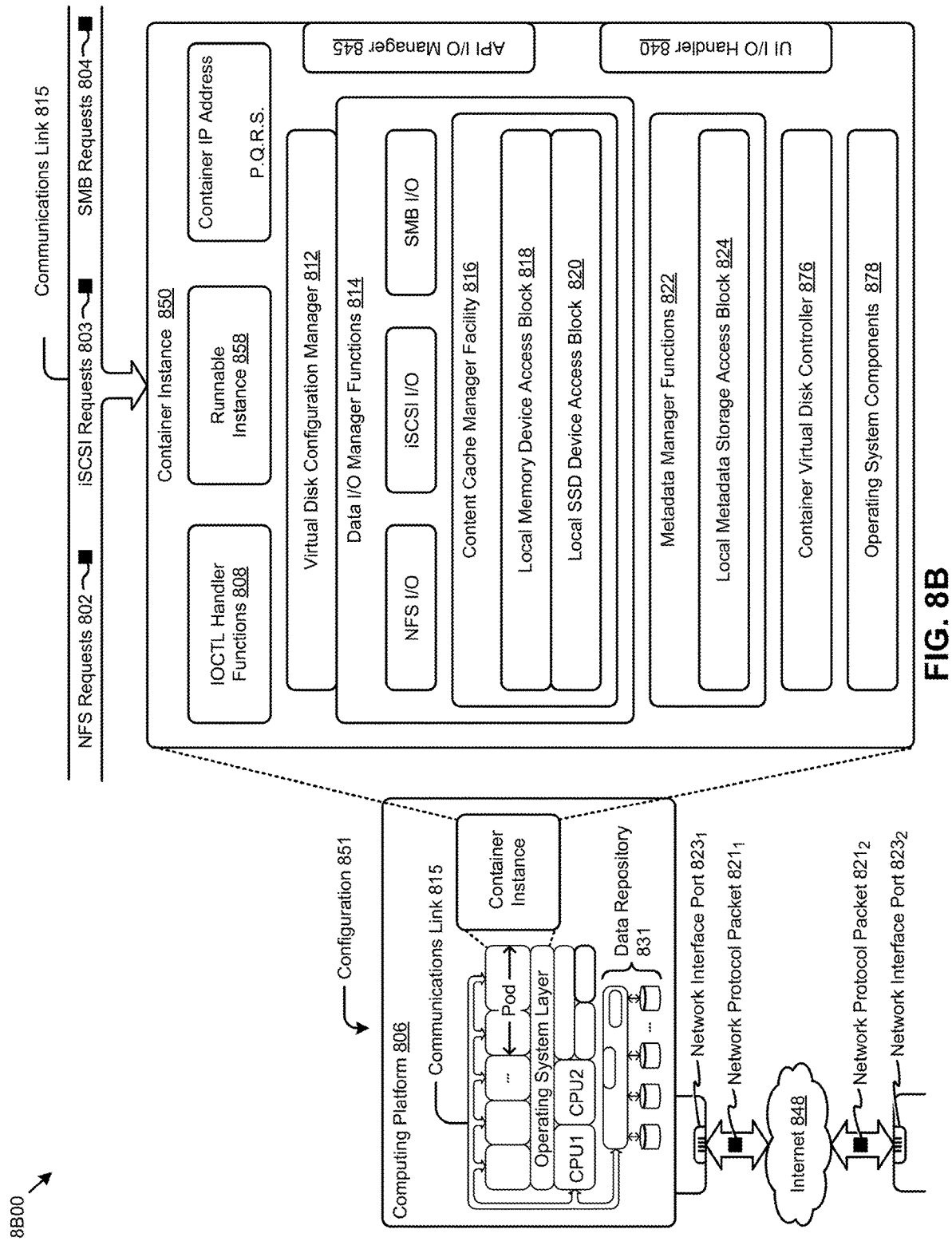

FIG. 8B depicts a virtualized controller implemented by a containerized architecture 8B00. The containerized architecture comprises a collection of interconnected components suitable for implementing embodiments of the present disclosure and/or for use in the herein-described environments. Moreover, the shown containerized architecture 8B00 includes a container instance in a configuration 851 that is further described as pertaining to the container instance 850. The configuration 851 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 850). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls-a", etc.). The container might optionally include operating system components 878, however such a separate set of operating system components need not be provided. As an alternative, a container can include a runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
receiving a batch message that comprises a plurality of Web service requests, wherein the batch message reduces a redundancy in the plurality of Web service requests by consolidating information shared by multiple Web service requests into a single information instance;
generating a service message derived at least in part from the batch message; and
dispatching the service message to a target Web service.

2. The method of claim 1, wherein the single information instance corresponds to at least one of a status, a header, an environment variable, or the information shared by the multiple requests.

3. The method of claim 1, further comprising communicating, to a client, a batched response message, wherein the responses are received from the target Web service, and the batched response message is generated based at least in part on a set of batch rules.

4. The method of claim 1, wherein at least one of receiving the batch message, generating the service message, or dispatching the service message, is performed at a layer in an instance of a Web service stack in a computing system.

5. The method of claim 4, wherein the layer is a portion of a processing stack within a virtualized controller virtual machine.

6. The method of claim 5, wherein at least a part of the processing stack within the virtualized controller virtual machine accesses a set of dictionary objects from a storage pool.

7. The method of claim 6, wherein the virtualized controller virtual machine acts on behalf of a user virtual machine, and dispatching the service message is performed without modifications to the target Web service.

8. The method of claim 1, wherein dispatching the service message is performed based at least in part on a set of dictionary objects.

9. A non-transitory computer readable medium having stored thereon a sequence of instructions which, when stored in memory and executed by a processor, causes the processor to perform a set of acts, the set of acts comprising:
receiving a batch message that comprises a plurality of Web service requests, wherein the batch message reduces a redundancy in the plurality of Web service requests by consolidating information shared by multiple Web service requests into a single information instance;
generating a service message derived at least in part from the batch message; and
dispatching the service message to a target Web service.

10. The non-transitory computer readable medium of claim 9, wherein the single information instance corresponds to at least one of a status, a header, an environment variable, or the information shared by the multiple Web service requests.

11. The non-transitory computer readable medium of claim 10, the set of acts further comprising communicating, to a client, a batched response message, wherein the responses are received from the target Web service, and the batched response message is generated based at least in part on a set of batch rules.

12. The non-transitory computer readable medium of claim 9, wherein at least one of receiving the batch message, generating the service message, or dispatching the service message, is performed at a layer in at least one instance of a Web service stack in a computing system.

13. The non-transitory computer readable medium of claim 12, wherein the layer is between a Web server interface and a Web application framework in the Web service stack.

14. The non-transitory computer readable medium of claim 9, further comprising instructions which, when stored in the memory and executed by the processor, causes the processor to perform the set of acts the further comprises exposing a callable object that is called to issue the batch message.

15. The non-transitory computer readable medium of claim 9, further comprising instructions which, when stored in the memory and executed by the processor, causes the processor to perform the set of acts that further comprises generating the batch message based at least in part on a set of batch rules.

16. The non-transitory computer readable medium of claim 9, wherein dispatching the service message is performed based at least in part on a set of dictionary objects, without modifications to the target Web service.

17. A system, comprising:
a non-transitory storage medium having stored thereon a sequence of instructions; and
a processor that executes the sequence of instructions, an execution of the sequence of instructions the processor to perform a set of acts, the acts comprising,
receiving a batch message that comprises a plurality of Web service requests, wherein the batch message reduces a redundancy in the plurality of Web service requests by consolidating information shared by multiple Web service requests into a single information instance;
generating a service message derived at least in part from the batch message; and
dispatching the service message to a target Web service.

18. The system of claim 17, wherein the processor executes the sequence of instructions to perform the set of acts that further comprises exposing a callable object that is called to issue the batch message.

19. The system of claim 17, wherein dispatching the service message is based at least in part on a set of batch rules, without modifications to the target Web service.

20. The system of claim 17, wherein at least one of receiving the batch message, generating the service message, or dispatching the service message, is performed at a layer in an instance of a Web service stack in a computing system.

\* \* \* \* \*